United States Patent
Joseph et al.

(10) Patent No.: US 11,267,346 B2
(45) Date of Patent: Mar. 8, 2022

(54) WYE-DELTA ALL-WHEEL ELECTRIC DRIVE SYSTEM FOR ELECTRIFIED VEHICLES

(71) Applicant: FORD GLOBAL TECHNOLOGIES, LLC, Dearborn, MI (US)

(72) Inventors: Matthew Joseph, St. Clair Shores, MI (US); Shehan Haputhanthri, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 538 days.

(21) Appl. No.: 16/370,263

(22) Filed: Mar. 29, 2019

(65) Prior Publication Data
US 2020/0307392 A1    Oct. 1, 2020

(51) Int. Cl.
*B60L 50/16*    (2019.01)
*B62D 5/04*    (2006.01)

(52) U.S. Cl.
CPC ............ *B60L 50/16* (2019.02); *B62D 5/0463* (2013.01); *B60L 2240/421* (2013.01); *B60L 2240/423* (2013.01)

(58) Field of Classification Search
None
See application file for complete search history.

(56) References Cited

U.S. PATENT DOCUMENTS

| | | | |
|---|---|---|---|
| 4,761,602 A | 8/1988 | Leibovich | |
| 5,675,222 A * | 10/1997 | Fliege | ............... B60L 3/003 318/139 |
| 8,183,814 B2 | 5/2012 | Fuchs | |
| 8,207,699 B2 | 6/2012 | Naiman | |
| 9,260,024 B1 | 2/2016 | Lau | |
| 9,266,438 B2 | 2/2016 | Power et al. | |
| 2013/0175954 A1 | 7/2013 | Astigarraga et al. | |
| 2014/0089064 A1 | 3/2014 | Hyde et al. | |
| 2014/0335995 A1 | 11/2014 | Swales et al. | |
| 2017/0133960 A1 | 5/2017 | Takahashi | |

FOREIGN PATENT DOCUMENTS

| | | |
|---|---|---|
| WO | 2009070089 | 6/2009 |
| WO | 2017174957 | 10/2017 |

* cited by examiner

*Primary Examiner* — Colby M Hansen
(74) *Attorney, Agent, or Firm* — Brooks Kushman PC; David Kelley

(57) ABSTRACT

A vehicle includes first and second electric machines driven by inverters and coupled to first and second sets of wheels. The vehicle includes switches configured to selectively connect each of the electric machines in one of a wye and a delta connection. The vehicle further includes a controller programmed to operate the switches to select a connection for the electric machines and operate the inverters to proportion a torque demand between the electric machines based on speed of the vehicle.

20 Claims, 5 Drawing Sheets

WYE-DELTA ALL-WHEEL ELECTRIC DRIVE SYSTEM FOR ELECTRIFIED VEHICLES

TECHNICAL FIELD

The present invention relates to wye-delta electric drive systems for electric vehicles.

BACKGROUND

Electric machines are used to propel and brake vehicles. The electric machines are comprised of a number of windings that may be connected in a wye or delta configuration. The peak torque and power characteristics of the electric machine are dependent on the type of connection. Typical vehicle designs are limited to selecting a particular connection configuration for the electric machines.

SUMMARY

A vehicle includes first and second electric machines driven by inverters and coupled to first and second sets of wheels, respectively. The vehicle further includes switches configured to selectively couple the inverters to the electric machines in a wye and a delta connection. The vehicle further includes a controller programmed to operate the switches to selectively couple the first electric machine in the wye connection and the second electric machine in the delta connection responsive to a speed of the vehicle being less than a speed threshold and operate the switches to change the first electric machine from the wye connection to the delta connection responsive to the speed exceeding the speed threshold.

The speed threshold may correspond to that speed at which a maximum torque of the first electric machine in the wye connection falls below a maximum torque of the second electric machine in the delta connection. The controller may be further programmed to operate the switches to change the second electric machine from the delta connection to the wye connection responsive to a torque demand exceeding a torque threshold and the speed being less than the speed threshold. The torque threshold may correspond to a sum of a maximum torque of the first electric machine connected in the wye connection and a maximum torque of the second electric machine connected in the delta connection. The controller may be further programmed to operate the inverters to proportion torque between the first electric machine and the second electric machine to satisfy a torque demand. The controller may be further programmed to operate the inverters to proportion torque between the first electric machine and the second electric machine to satisfy a torque demand and maximize system efficiency. The controller may be further programmed to, responsive to the speed crossing from less than the speed threshold to greater than the speed threshold, operate the inverter associated with the first electric machine to drive a torque of the first electric machine to zero before operating the switches to selectively connect the first electric machine in the delta connection. The controller may be further programmed to operate the inverter associated with the first electric machine to increase torque of the first electric machine to satisfy a torque demand. The controller may be further programmed to operate the inverters to proportion torque between the first electric machine and the second electric machine such that as the speed increases torque allocated to the first electric machine decreases and torque allocated to the second electric machine increases.

A vehicle includes a first electric machine coupled to a first set of wheels and connected to a first inverter in a wye configuration and a second electric machine coupled to a second set of wheels and connected to a second inverter in a delta configuration. The vehicle further includes a controller programmed to, responsive to a speed of the vehicle being less than a first speed threshold, operate the first and second inverters to satisfy a torque demand by proportioning the torque demand between the first and second electric machines, and, responsive to the speed being greater than the first speed threshold and the torque demand being less than a torque threshold, operate the first and second inverters to satisfy the torque demand entirely by the second electric machine.

The torque threshold and the first speed threshold may correspond to torque and speed values at which a maximum torque of the second electric machine equals a maximum torque of the first electric machine. The controller may be further programmed to, responsive to the speed being less than a second speed threshold that is less than the first speed threshold, allocate the torque demand to the first electric machine and operate the first and second inverters to drive the first electric machine to satisfy the torque demand. The controller may be further programmed to, responsive to the speed exceeding the first speed threshold and the torque demand being greater than the torque threshold, allocate a difference between the torque demand and the torque threshold to the first electric machine and operate the first and second inverters to drive the electric machines to satisfy the torque demand. The controller may be further programmed to operate the first and second inverters to proportion the torque demand between the first and second electric machines such that as the speed increases torque allocated to the first electric machine decreases and torque allocated to the second electric machine increases and as the speed decreases torque allocated to the first electric machine increases and torque allocated to the second electric machine decreases. The controller may be further programmed to operate the first and second inverters to proportion the torque demand between the first and second electric machines to maximize system efficiency.

A method implemented by a controller includes operating switches to selectively connect a first electric machine in a delta connection and a second electric machine in a wye connection. The method further includes operating inverters coupled to the electric machines to proportion a torque demand to the electric machines. The method further includes operating the switches to change the first electric machine from the delta connection to the wye connection responsive to the torque demand exceeding a torque threshold and a speed of the electric machines being less than a speed threshold.

The torque threshold may be a maximum torque achievable with the first electric machine connected in a delta connection. The speed threshold may correspond to that speed at which a maximum torque of the first electric machine in the wye connection falls below a maximum torque of the first electric machine in the delta connection. The method may include operating the inverters to reduce torque to the first electric machine to zero before operating the switches to change from the delta connection to the wye connection. The method may further include operating the inverters to ramp torque to the first electric machine to satisfy the torque demand after being connected in the wye connection.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

An electric machine consists of a number of windings that are electrically driven to produce torque. An electric machine may be a three-phase machine that is driven by a three-phase inverter. The windings of the electric machine may be connected to the inverter in a delta or a wye configuration. In a wye-connected configuration, the windings are connected in a Y-shape with each winding connected to a neutral point. In delta-connected configuration, each winding is connected to the other two windings (schematically resembles a triangle).

The wye- and delta-connected electric machines have distinct torque and power capability due to the respective winding connection configuration. Typical electric machine applications statically connect the electric machine in one of the configurations. However, benefits may be derived from a dynamic electric machine connection strategy. The dynamic electric machine connection strategy may implement a control strategy to manage transitions between the types of connections to optimize vehicle performance.

Figure 1:
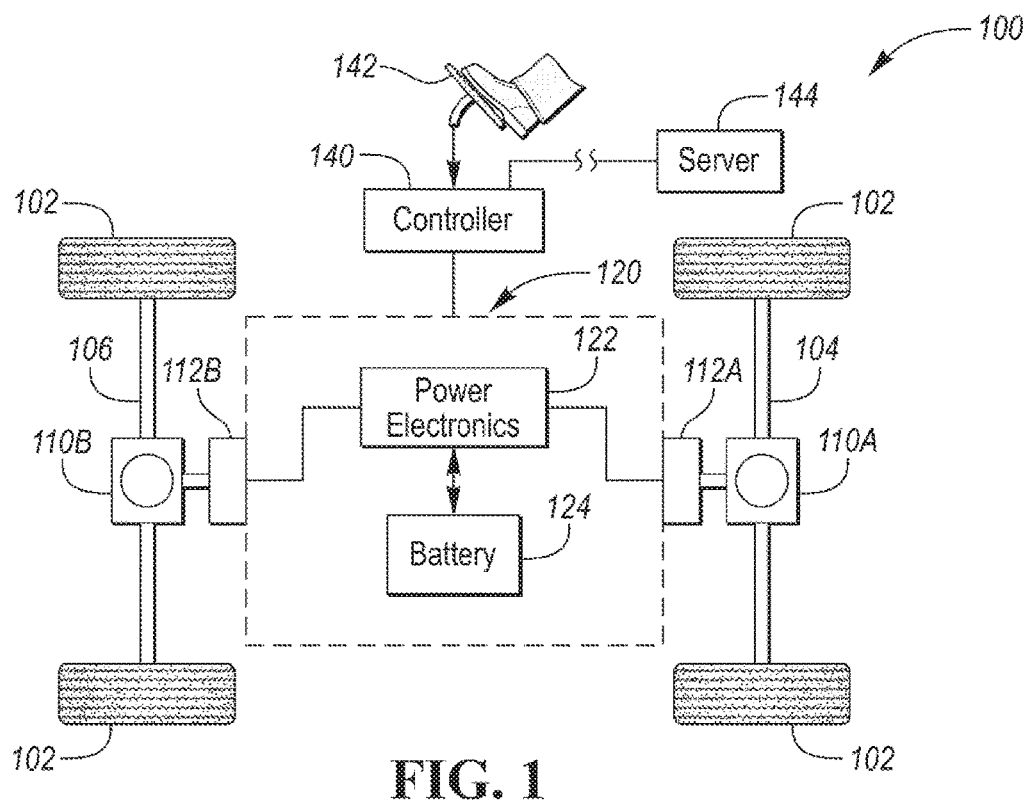
FIG. 1 is a schematic of a vehicle.

Referring to FIG. 1, a vehicle 100 is shown. The vehicle 100 may include a set of wheels 102. The wheels 102 may be coupled to a front axle 104 or a rear axle 106 that are configured to drive the wheels 102. The vehicle 100 may include one or more electric machines 112 that are coupled to a respective axle via a corresponding gearbox 110. The vehicle 100 may include a front-drive electric machine 112A that is mechanically coupled to a front axle gearbox 110A. The vehicle 100 may include a rear-drive electric machine 112B that is mechanically coupled to a rear axle gearbox 110B. The front axle gearbox 110A and the rear axle gearbox 110B may be coupled to the front axle 104 and the rear axle 106, respectively. The gearboxes 110 may include a differential for transferring torque from the corresponding electric machine 112 to the corresponding axle and wheels 102. In other configurations, an electric machine 112 may be coupled to each of the wheels 102 directly or via an associated gearbox. Such a configuration would have four electric machines. Any number of electric machines and configurations thereof are contemplated in this disclosure and may be referred to collectively as an electric machine or a plurality of electric machines throughout this disclosure.

The electric machines 112 may be operated by one or more power electronics modules 122. The power electronics modules 122 may be powered by a traction battery 124. The power electronics module 122 may be directed or controlled by a controller 140. The controller 140 may include gate drivers or other hardware to drive switches of the power electronics module 122 along with processors, memory, and communications to perform logic functions and exchange information. The controller 140 may include one or more processors and controllers configured to perform such functions. The controller 140 may further include various types of computing apparatus in support of performance of the functions of the controller 140 described herein. In an example, the controller 140 may include one or more processors configured to execute computer instructions, and a storage medium on which the computer-executable instructions and/or data may be maintained. A computer-readable storage medium (also referred to as a processor-readable medium or storage) includes any non-transitory (e.g., tangible) medium that participates in providing data (e.g., instructions) that may be read by a computer (e.g., by the processor(s)). In general, a processor receives instructions and/or data, e.g., from the storage, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C #, Fortran, Pascal, Visual Basic, Python, Java Script, Perl, PL/SQL, etc. The controller 140 may also communicate with a server 144 that is offboard the vehicle 100 to retrieve autonomous vehicle commands or other information regarding transit of the vehicle 100. The controller 140 may further receive a control signal of a pedal(s) 142 from operators of the vehicle 100 or similar autonomous commands. The controller 140 may also determine autonomous commands and otherwise drive the vehicle 100 autonomously. The server 144 may include processors and data storage to provide information to the vehicle 100.

Figure 2:
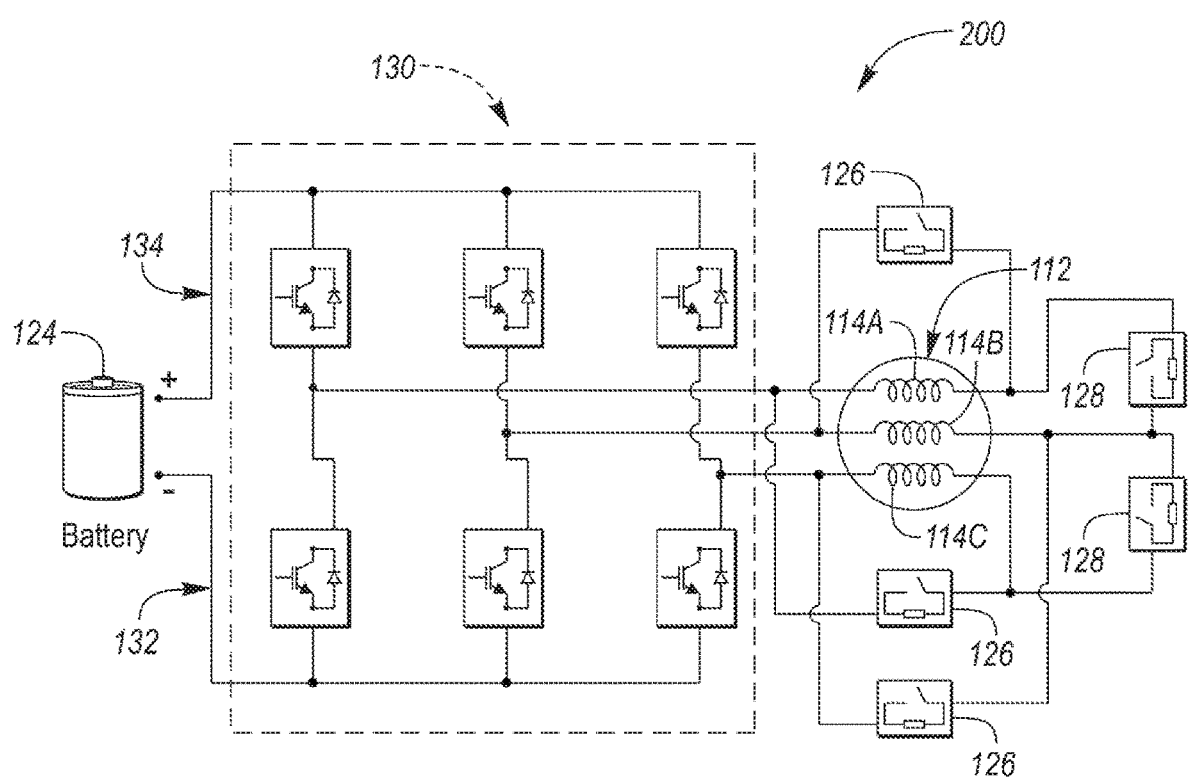
FIG. 2 is a schematic of a power electronics system.

Referring to FIG. 2, a power electronics configuration 200 is shown for operating the electric machines 112. The traction battery 124 may be used to energize or receive energy from the power electronics configuration 200. The power electronics configuration 200 may include one or more inverters 130 that include set of switching elements configured to convert a direct current (DC) voltage from the traction battery 124 to an alternating current (AC) signal for the electric machines 112. The traction battery 124 energizes terminals or rails 132, 134 of the inverters 130. As shown, the inverters 130 may selectively energize the windings 114A, 114B, 114C corresponding to the associated phases of the electric machine 112 by operation of the switching elements. The controller 140 may operate the inverters 130 to cause the electric machines 112 to generate torque. The controller 140 may implement various control strategies such as vector control or field-oriented control to control the torque output of the electric machines 112. In the present example, the front-drive electric machine 112A and the rear-drive electric machine 112B may be driven by the inverters 130.

As shown, the windings 114A, 114B, 114C may be selectively arranged or configured in a delta or a wye configuration. One or more sets of switches may be configured to selectively connect each of the electric machines 112 in one of a wye and a delta connection. The windings 114A, 114B, 114C may be associated with a set of delta switches 126 that configure the windings as a delta connection when closed. The windings 114A, 114B, 114C may be associated with a set of wye switches 128 that configure the windings 114A, 114B, 114C as a wye connection when closed. Other winding configurations may be used. That is, additional inverters 130 may be used to alternately power an additional set of windings such that the switches 126, 128 as shown are not necessary. Meaning, the electric machine 112 may be double wound with independent wye and delta windings, or the electric machine 112 may also be wound with independent wye and delta switches 126, 128 to selectively create wye and delta windings, or some combination thereof. Any configuration, combination, addition, or subtraction of inverters 130, electric machines 112, and windings 114A, 114B, 114C known and unknown is contemplated by this disclosure. The main feature described is that the electric machine may be selectively operated in either a wye or a delta configuration. The controller 140 may be programmed to operate the switches 126, 128 to selectively connect each of the electric machines 112 in one of the wye and the delta connection based on various criteria (e.g., speed).

Figure 3:
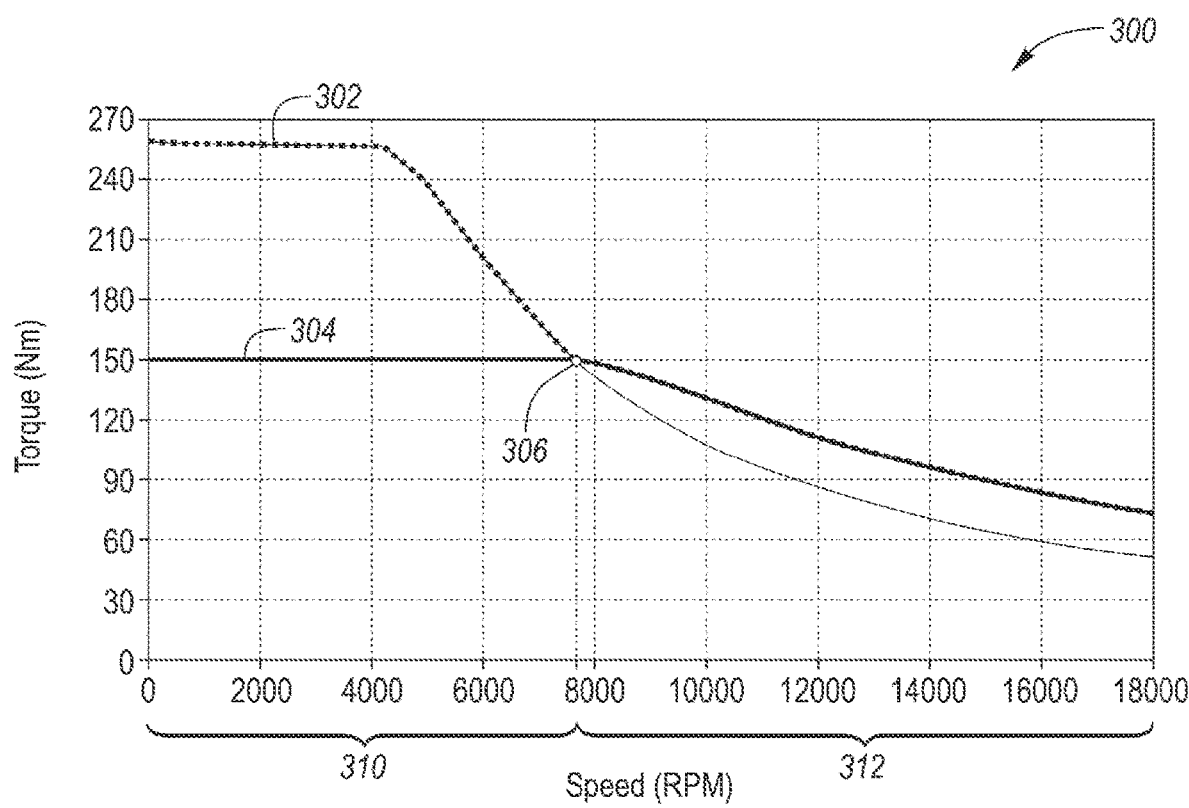
FIG. 3 is a graph comparing electric machine torque and speed of delta and wye windings operating an electric machine.

Referring to FIG. 3, a graph 300 is shown. The graph 300 depicts a representative relationship between speed and torque for the electric machine 112 utilizing field-oriented control. A wye-connection curve 302 depicts the torque-speed curve when the electric machine 112 is wye connected. The wye-connection curve 302 indicates high torque at low speeds and decreasing torque at high speeds. A delta-connection curve 304 depicts the torque-speed curve when the electric machine 112 is delta connected. The delta-connection curve 304 indicates a constant torque and greater peak power capability over a greater speed range when compared to the wye-connection curve 302. Stated differently, the delta-connection curve 304 maintains a greater peak torque and power capability up to a greater speed than the wye-connection curve 302. However, the peak torque value for the delta-connection curve 304 is less than the peak torque value for the wye-connection curve 302 at lower speeds.

As shown, for a first range of speeds 310 the delta-connected windings 304 produce less torque than the wye-connected windings 302, and for a second range of speeds 312 greater than the first range of speeds 310, the wye-connected windings 302 produce less torque than the delta-connected windings 304. A cross-over speed 306 may be the speed at which the delta-connected windings 304 can provide a greater peak torque than the wye-connected windings 302. In terms of maximum torque capability, it may be preferred to operate the electric machine 112 in a wye configuration at speeds below the cross-over speed 306 and in a delta configuration above the cross-over speed 306.

An electric machine connected in a wye configuration may be capable of generating higher peak torque and lower peak power than if the electric machine were connected in a delta configuration. In some configurations, the electric machine may be a permanent magnet synchronous motor (PMSM). The PMSM generates a torque that is proportional to the current supplied to the windings. When supplied current and peak generated torque are the same between a wye and delta connected electric machine (e.g., cross-over speed 306), the increased phase voltage of a delta winding allows for higher power capability and thereby increased torque at higher speeds (e.g., speeds greater than the first speed range 310). The inverters 130 may be configured with voltage and frequency modulation capability. As such, the torque may be directly controlled in either a wye configuration or a delta configuration.

Delta-connected and wye-connected windings have different relationships between line and phase currents and voltages. The line voltage is the voltage measured between two of the line conductors (between the inverter 130 and electric machine 112). The line current is the current measured through each of the line conductors. The phase voltage is the voltage measured across one of the electric machine windings 114. The phase current is the current measured through each of the phase windings 114. For delta-connected windings, the line voltage and currents are related to the phase voltage and currents as follows:

$$V_L = V_P \quad (1)$$

$$I_L = \sqrt{3} I_P \quad (2)$$

For wye-connected windings, the line voltage and currents are related to the phase voltage and currents as follows:

$$V_L = \sqrt{3} V_P \quad (3)$$

$$I_L = I_P \quad (4)$$

For an inverter phase with an RMS phase current of Iphase Arms (e.g., current output for a single phase), the maximum RMS phase current that can be supplied to each delta-connected phase winding is Iphase/$\sqrt{3}$ Arms. This may limit the peak torque output of the PMSM connected in a delta configuration at low speeds. However, a higher voltage may be supplied to the same windings. This allows operation at a constant V/Hz ratio that extends at higher speeds for a delta-connected electric machine versus a wye-connected electric machine. This allows for increased torque and power for the delta-connected machine at higher speeds (e.g., above speed threshold 310 of FIG. 3).

The electric machine 112 may be configured with a common phase winding design. For example, the windings 114 of the electric machines 112 may include a same number of turns and same copper gauge wiring. The electric machine 112 may be connected in either a wye or delta configuration. The electric machine 112 may be designed such that it may be operated in either configuration and achieve desired operational performance.

In some configurations, the front-drive electric machine 112A may be connected in a delta configuration and the rear-drive electric machine 112B may be connected in a wye configuration. The connection may be hardwired or achieved by operation of the switches as depicted in FIG. 2.

The electric machines 112 on the front and rear axles may be configured with a different winding connection (delta or wye). The connection strategy takes advantage of the fact that each of the winding configurations has advantages in certain operating regions. However, to achieve the benefits a control strategy may be implemented to manage operation of the electric machines 112. The controller 140 may be programmed with a control strategy to manage the torque output of the electric machines 112. Further, the controller 140 may be programmed to blend the torque outputs of the electric machines to achieve improved performance. In other configurations, the front-drive electric machine 112A may be wye connected and the rear-drive electric machine 112B may be delta connected. The control strategy that is described herein remains applicable to the alternative configuration.

Figure 4:
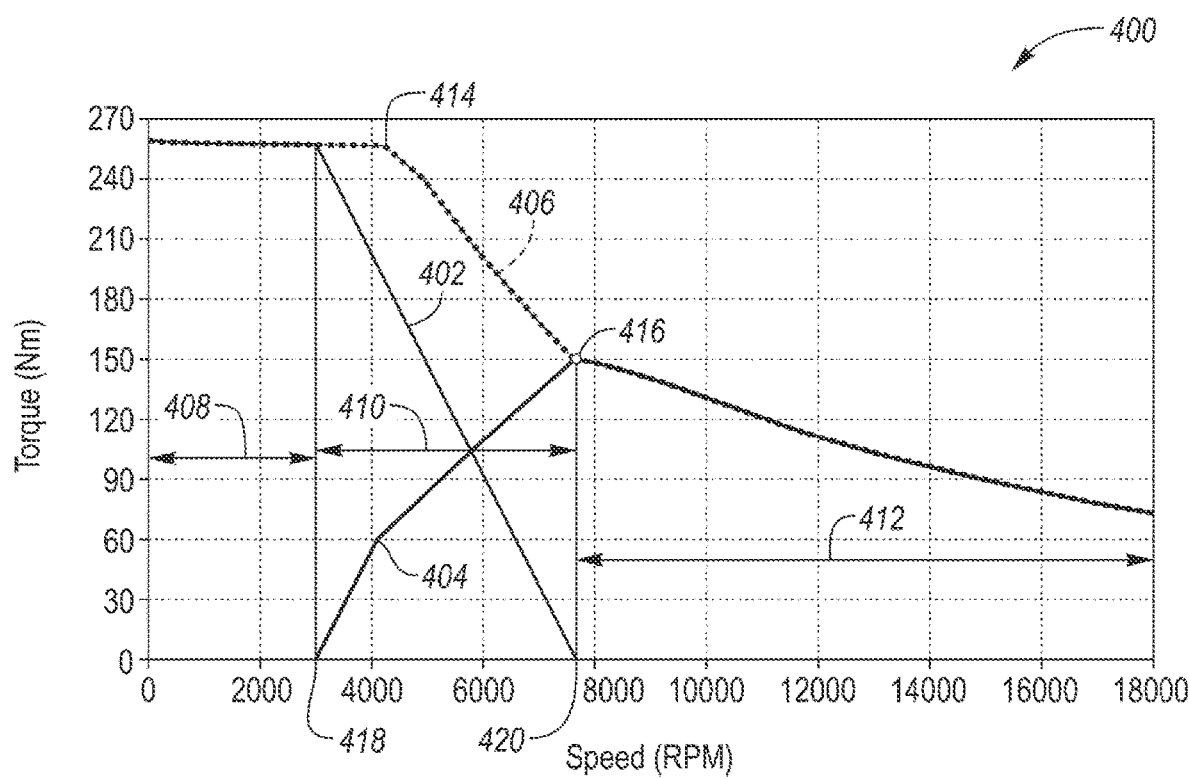
FIG. 4 is a graph depicting the combined electric machine torque and speed for an electric drives system including delta and wye connected windings.

FIG. 4 depicts a graph 400 showing torque and speed relationship for a possible control strategy during a wide-open throttle (WOT) driving maneuver with system power limitations (e.g., system cannot supply full power to each of the electric machines 112). The example assumes a wye-connected rear-drive electric machine 112B and a delta-connected front-drive electric machine 112A. The rear-drive electric machine 112B may have a greater peak torque at low speeds since it is connected in a wye configuration. As such, the control strategy may favor the rear-drive electric machine 112B at lower speeds. The graph 400 depicts a rear-drive electric machine command torque curve 402 that represents a desired operating torque as a function of speed for the rear-drive electric machine 112B. The graph 400 also depicts a front-drive electric machine command torque curve 404 that represents a desired operation torque as a function of speed for the front-drive electric machine 112A. The electric machines 112 may be commanded to supply torque simultaneously resulting in a combined torque curve 406 that represents the total torque provided by the electric machines 112. In this example, the combined torque curve 406 represents the maximum torque output of the propulsion system. Torque values less than the maximum torque output are achievable as will be described herein.

The speed values may be expressed as a speed of the electric machines 112 or the speed of the vehicle 100. Vehicle speed may be derived from wheel speeds, electric machine speeds, accelerometer inputs, and/or any combinations thereof. The vehicle speed may be related to the electric machine speeds by a known factor. For example, for a single speed gearbox, the electric machine speed can be related to the wheel speeds by a gear ratio. The wheel speeds, in turn, can be related to the vehicle speed with knowledge of the wheel radius. Corrections may be applied during acceleration and deceleration events. As such, the control strategies to be described herein may use vehicle or electric machine speeds.

Below a first speed threshold 418, the system may be configured to satisfy a torque demand with torque from the rear-drive electric machine 112B. A rear-only range 408 may be defined between zero speed and the first speed threshold 418. In the rear-only range 408, torque may be supplied only by the rear-drive electric machine 112B. Since rear-drive electric machine 112B is wye-connected, a maximum peak torque may be available (when compared to the delta-connected front-drive electric machine 112A).

Above a second speed threshold 420, the system may be configured to satisfy a torque demand with torque from the front-drive electric machine 112A. A front-only range 412 may be defined between the second speed threshold 420 and a maximum operating speed of the electric machines 112. In the front-only range 412, torque may be supplied only by the front-drive electric machine 112A. As the front-only range 412 is defined at higher speeds, the front-drive electric machine 112A, being delta connected, has a greater peak torque capability than the rear-drive electric machine 112B.

The electric machines 112 may be operated in a blended-operating mode over a range of speed in which torque is split between the electric machines 112. For example, between the first speed threshold 418 and the second speed threshold 420, a blended-operation range 410 may be defined. In the blended operation range 410, a torque demand may be satisfied with torque from both of the electric machines 112. The torque may be blended in a variety of ways. In some configurations, the torque allocated to the wye-connected electric machine may be ramped linearly to zero between the first speed threshold 418 and the second speed threshold 420. The torque allocated to the delta-connected electric machine may be ramped up between the first speed threshold 418 and the second speed threshold 420. The blended-operation range 410 that is depicted is merely one example of a possible blended-operation range 410. The specific blended-operation range 410 that is defined may be changed for different vehicle types and electric machine configurations/specifications.

At low speeds (e.g., below first speed threshold 418), the controller 140 may be programmed to operate the inverters 130 to command torque from the rear-drive electric machine 112B. In this mode, the vehicle operates in a rear-wheel drive (RWD) mode of operation. When the speed exceeds the first speed threshold 418, the controller 140 may be programmed to operate the inverters 130 to command torque from both electric machines 112 simultaneously to provide a cumulative torque output (represented by the combined torque curve 406). In this mode, the vehicle operates in an all-wheel drive (AWD) mode of operation. The cumulative propulsion torque is the sum of the torques provide by each of the electric machines 112 and associated gearbox. For example, the gearboxes 110 may define different final drive ratios that affect the torque.

Above the second speed threshold 420, the controller 140 may be programmed to operate the inverters 130 to command torque from on the front-drive electric machine 112A. In this mode, the vehicle operates in a front-wheel drive (FWD) mode of operation. The second speed threshold 420 may correspond to an electric machine speed at which the peak power output of the delta-connected electric machine (front-drive electric machine 112A) is achieved (approximately 7800 RPM in this example). The rear-drive electric machine 112B may be commanded to provide no torque.

In some configurations, the electric machines 112 may be hardwired in the desired configuration. For example, the front-drive electric machine 112A may be connected to the inverter 130 in a delta configuration and the rear-drive electric machine 112B may be connected to the inverter 130 in a wye configuration. The switching system depicted by the switches 126, 128 of FIG. 2 are not necessary for the above described operation. However, the addition of the switches 126, 128 supports the above described operation and provides additional benefits. The presence of the switches 126, 128 allows the controller 140 to dynamically change the connection configuration. By incorporating the switches 126, 128, the electric machines 112 can be configured in either wiring configuration and may result in improved performance as each of the electric machines 112 can be operated in the connection strategy that yields the desired performance.

While the example describes a WOT cycle, the control strategy may also function when less than full torque is requested from the operator. The torque and power split in the blended operation range 410 may be variable due to the voltage and frequency modulation capability of the power electronics module 122. The control strategy may be configured to utilize the full capability and advantages of each of the wye and delta connected electric machines. The torque distribution in the blended operation range 410 can be varied so long as the commanded torques for each of the electric machines 112 does not exceed the maximum torque rating. In some configurations, the blended-operation range 410 may extend from zero to the maximum speed of the electric machines. The individual electric machine torques may be selected based on criteria such as efficiency or performance.

The controller 140 may store information regarding the torque/speed capability of each of the electric machines 112 when connected in the wye and delta configurations. The controller 140 may receive or determine a torque demand based on inputs such as the acceleration pedal 142. The controller 140 may consider the present speed of the electric machines 112 and determine the manner in which the torque demand may be satisfied by one or both of the electric machines 112. The controller 140 may be further programmed to determine a torque proportion that maximizes the system efficiency or minimizes system losses. The optimal torque proportion may define a torque split between the electric machines 112. The torque proportioning may include satisfying the torque demand with only one of the electric machines 112. That is, at least one of the electric machines 112 may have a zero-torque command while the other supplies the entire torque demand.

In some configurations, the rear-drive electric machine 112B may be commanded to provide torque (by operation of the inverter 130) at speeds greater than the second speed threshold 420. The torque provided by the rear-drive electric machine 112B may supplement the torque provided by the front-drive electric machine 112A. In configurations having selectable electric machine connections, the rear-drive electric machine 112B may be switched from a wye connection to a delta connection at speeds greater than the second speed threshold 420 which will allow for increased torque and power at higher speeds. In addition, the front-drive electric machine 112A may be switched from a delta connection to a wye connection during a deceleration event. This may allow the front-drive electric machine 112A to more efficiently increase regenerative power and torque at speeds less than the first speed threshold 418. That is, the front-drive electric machine 112A may be commanded to provide regenerative torque at low speeds to supplement the rear-drive electric machine 112B.

As described previously herein, the vehicle may include an electric machine 112 at each of the wheels 102. The control strategy may be applied to individual wheel motors to provide torque vectoring and additional dynamic vehicle control. For example, the connection strategy may be based on a speed of the electric machines 112 or a speed of the vehicle.

In the blended operation range 410, it may be beneficial to operate only one of the electric machines 112. For example, the delta-connected electric machine may have greater efficiency at a particular torque-speed operating point than the wye-connected electric machine. Efficiency may be dependent on the operating voltage, torque command, electric machine speed and the electric machine design in which there may be compromises made between winding and core losses. The controller 140 may be programmed to alter the torque distribution to provide greater overall system efficiency. In addition, the torque distribution may consider other performance considerations such as cornering, acceleration, and braking. The torque distribution may be altered to enhance cornering, acceleration, and/or braking. For example, an optimal torque distribution may be altered when excessive wheel slip is detected on one of the axles. In this situation, it may be desirable to reduce the torque on the axle with excessive wheel slip and reallocate the torque to the other axle to satisfy the torque demand.

The delta-connected electric machine may be designed for high-speed efficiency (e.g., lower core losses). The wye-connected electric machine may be designed for low-speed efficiency (e.g., less winding losses). The controller 140 may be programmed to operate the electric machines 112 to maximize efficiency of the propulsion system. Such designs may result in reduced size electric machines since each is designed for a specific vehicle operating range. For example, the wye-connected electric machine may operate up to 7000 RPM while the delta-connected electric machine is configured to operate between 7000 RPM and 15,000 RPM.

The controller 140 may be programmed to implement a control strategy that results in an operator perception of a two-speed gearbox. The control strategy may be configured to simulate operation of a two-speed gearbox using single-speed gearboxes coupled to the electric machines 112. For example, the controller 140 may be programmed to operate the electric machines 112 in a wye configuration at low speeds. At higher speeds, the controller 140 may be programmed to change the electric machines 112 to being delta connected. This mode of operation may be a performance or sport mode of operation. This mode of operation may emulate a gear shift of a conventional transmission. A transition point may be defined at which the motor connection is to be switched. At the transition point, electric machine current and torque may be brought to zero. The switches 126, 128 may be operated to change from the wye connection to the delta connection. After the connection change, current and torque may be brought up to the demanded torque. The above transition may be applied to one of the electric machines at a time. Such a system may be referred to as a two-speed electric drive system.

The controller 140 may be programmed to operate the switches to selectively couple the rear electric machine in the wye connection and the front electric machine in the delta connection responsive to a speed of the vehicle being less than a speed threshold. The speed threshold may correspond to that speed at which a maximum torque of the electric machine when configured in the wye connection falls below a maximum torque of the electric machine when configured in the delta connection. Responsive the to speed exceeding the speed threshold, the controller 140 may operate the switches to change the rear electric machine from the wye connection to the delta connection. Below the speed threshold and responsive to a torque demand exceeding a torque threshold, the controller 140 may be programmed to operate the switches to change the first electric machine from the delta connection to the wye connection. The torque threshold may correspond to a sum of the maximum torque of the rear electric machine connected in the wye connection and a maximum torque of the front electric machine connected in the delta connection. The torque threshold may also change with speed since the maximum torque varies with speed. When changing the connection of the electric machines, the controller 140 may operate the inverter associated with the electric machine to drive a torque of the electric machine to zero before operating the switches to selectively change the connection. In some cases where the other electric machine has a torque reserve, the controller 140 may increase torque to the other electric machine to compensate for the torque reduction. After the switches are changed, the inverter may be operated to ramp torque to satisfy the torque demand.

Figure 5:
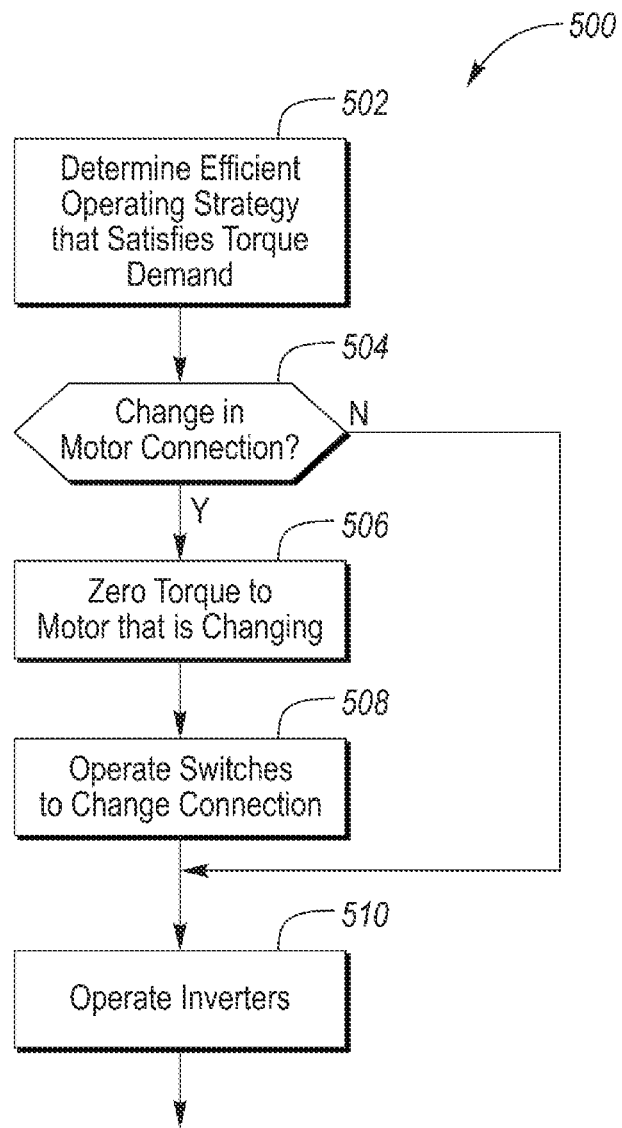
FIG. 5 is a flow chart for a possible sequence of operations for operating a propulsion control system that includes selectable winding connections.

FIG. 5 depicts a possible flow chart 500 for a sequence of operations that may be implemented in the controller 140. At operation 502, the controller 140 may implement a strategy to determine an efficient operating strategy that satisfies the torque demand. The efficient operating strategy may determine an electric machine connection strategy and corresponding torque distribution that maximizes efficiency or minimizes losses of the system. The efficient operating strategy determination may consider the speed and torque demand. The controller 140 may implement an algorithm that considers each of the connection type (wye and delta) for each of the electric machines 112. The torque demand may be proportioned between the electric machines 112.

At operation 504, a check may be performed to determine if a change in motor connection for any of the electric machines 112 is required to meet a predetermined efficiency threshold. If the motor connection is changed from the previous connection state, operation 506 may be performed. At operation 506, the inverter may be operated to command zero torque to the corresponding electric machine. When the torque has been zeroed, operation 508 may performed. At operation 508, the controller 140 may operate the switches to change the connection of the electric machine. Operation 510 may then be performed.

If there is no change in connection, operation 510 may be performed. At operation 510, the controller 140 may operate the inverters 130 to provide the torque distribution determined in operation 502. The sequence of operations may be periodically repeated.

Note that for system configurations without the switches, operation 504 through 508 are not used. Further, operation 502 may be simplified as the connection strategy is already determined and hardwired. The control strategies may consider the fixed wiring in the optimization routines.

Figure 6:
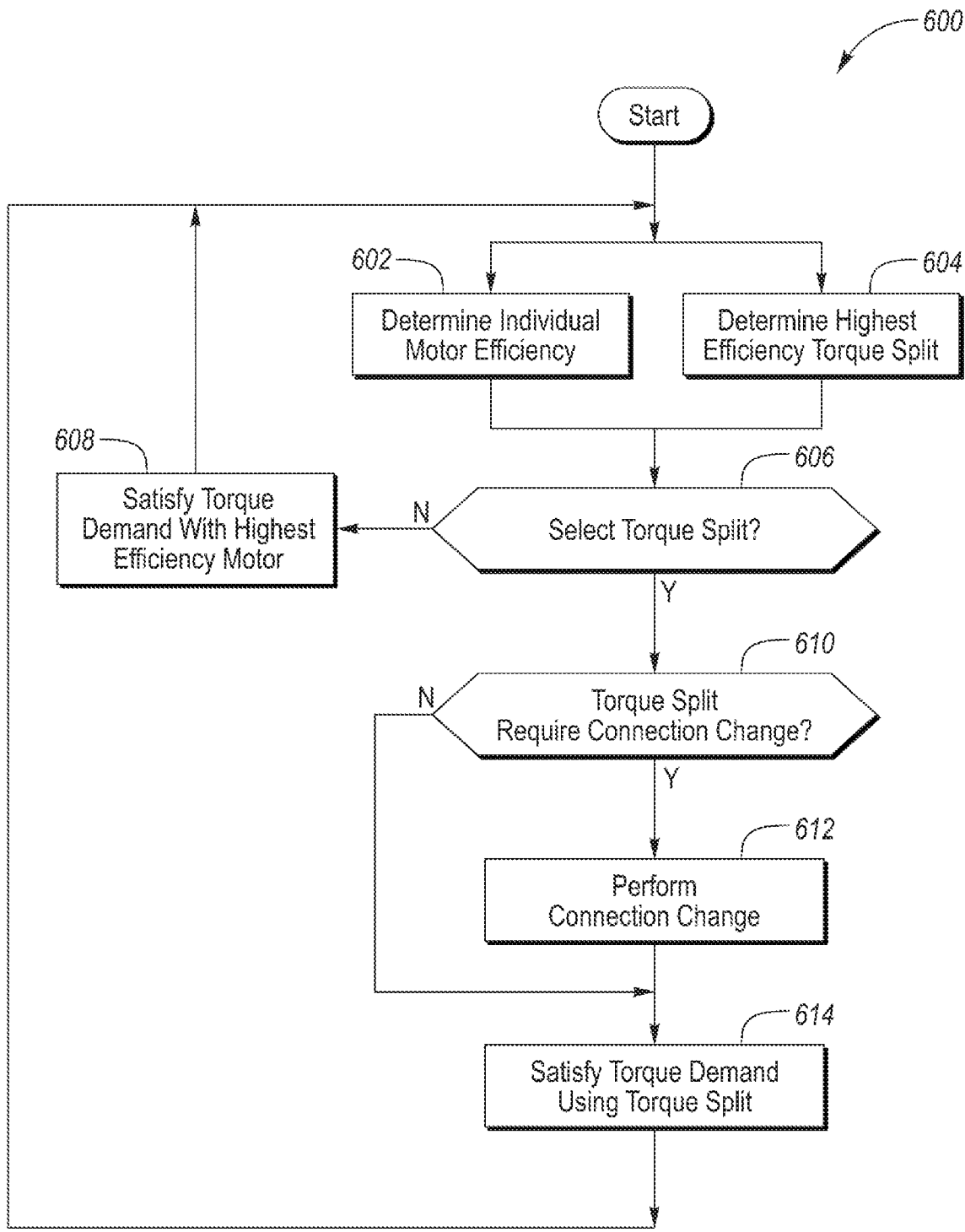
FIG. 6 is a flow chart for a possible sequence of operations for selecting the most efficient winding connections and torque split for the electric machines.

FIG. 6 depicts a flowchart 600 for a possible sequence of operations for determining the connections for the electric machines 112. At operation 602, the controller 140 may determine the efficiency of using each of the electric machines 112 individually to satisfy the torque demand. That is, computing the efficiency assuming that 100% of the torque demand is allocated to only one of the electric machines 112. In some configurations, each of the electric machines 112 may be considered in each of the wye and delta configurations. For example, system efficiency values may be determined for front-wye, front-delta, rear-wye, and rear-delta operating strategies. To simplify operation, the single motor operating strategies may use a fixed connection strategy for each electric machine 112 (e.g., rear connected wye, front connected delta). This may prevent switching connections when only a single electric machine is used. The efficiency computation may be based on system inputs including traction battery voltage, electric machine torque commands, electric machine speeds, and estimated system losses. The estimated system losses may include losses for the electric machines and power electronics connected in wye and delta configurations. The system efficiency computation may be further based on the properties (e.g., losses, gear ratios, final drive ratios) of the gearboxes 110. The controller 140 may select the highest efficiency solution for further processing. In some configurations, the controller 140 may select the configuration having an efficiency that exceeds the efficiency of the previous solution by a predetermined amount or threshold to prevent cycling between solutions (e.g., add hysteresis to selection).

At operation 604, the controller 140 may determine the torque split between the electric machines 112 that results in the greatest system efficiency based on the system inputs. The computation may consider each possible connection option for the front and rear electric machines 112. For example, the efficiency may be computed for the following front-rear connection configurations: wye-wye, wye-delta, delta-wye, and delta-delta. The controller 140 may implement an optimization algorithm to determine the most efficient torque split for satisfying the torque demand for each of the options. The torque split determination may factor in the properties of the gearboxes 110 (e.g., gear ratios) and the torque demand. The controller 140 may select the configuration having the greatest efficiency for further processing. In some configurations, the controller 140 may select the torque split configuration having an efficiency that exceeds the efficiency of the previous torque split solution by a predetermined amount or threshold to prevent cycling between solutions (e.g., add hysteresis to selection).

The strategy to this point may have potential solutions representing the highest efficiency values for individual electric machine operation and for torque split operation. At operation 606, a check may be performed to determine if the torque split configuration is to be selected. In some configurations, the torque split configuration may be selected when the torque split efficiency is greater than the individual machine efficiency. To prevent excessive switching or cycling between operating modes, the check may also consider the presently selected operating mode (e.g., individual or torque split). If the present operating mode is individual operation, the operating mode may change to the torque split mode if the selected torque split efficiency is a predetermined amount or threshold greater than the selected individual efficiency. If the present operating mode is torque split, the operating mode may remain in the torque split mode if the selected torque split efficiency is greater than the selected individual efficiency. If the present operating mode is torque split, the operating mode may change to the individual mode if the selected torque split efficiency falls below the selected individual efficiency. This strategy incorporates some hysteresis on the mode selection to prevent excessive cycling between modes. If the torque split mode is not selected, then operation 608 may be performed. At operation 608, the torque demand may be satisfied with the electric machine having the greatest efficiency value. The controller 140 may operate the other electric machine 112 (e.g., the less efficient motor) to reduce torque to zero. The controller 140 may also command the connection switches to be opened (e.g., disconnected unused electric machine) and may shut down the corresponding inverter to further reduce losses in the unused electric machine. In some configurations, a connection change may be performed if the most efficient connection has changed. If the torque split mode is selected, operation 610 may be performed.

At operation 610, a check may be performed to determine if the electric machine connections are to be changed to achieve the most efficient torque split. If the connection of one or more of the electric machines 112 is to be changed, operation 612 may be performed. At operation 612, the connection of the affected electric machines 112 may be changed as described previously herein. To prevent discontinuous torque, only one of the electric machines 112 may be changed at a time. If the connection does not have to be changed, operation 614 may be performed. At operation 614, the controller 140 may operate the electric machines 112 to satisfy the torque demand using the computed torque split to provide optimal system efficiency.

Figure 7:
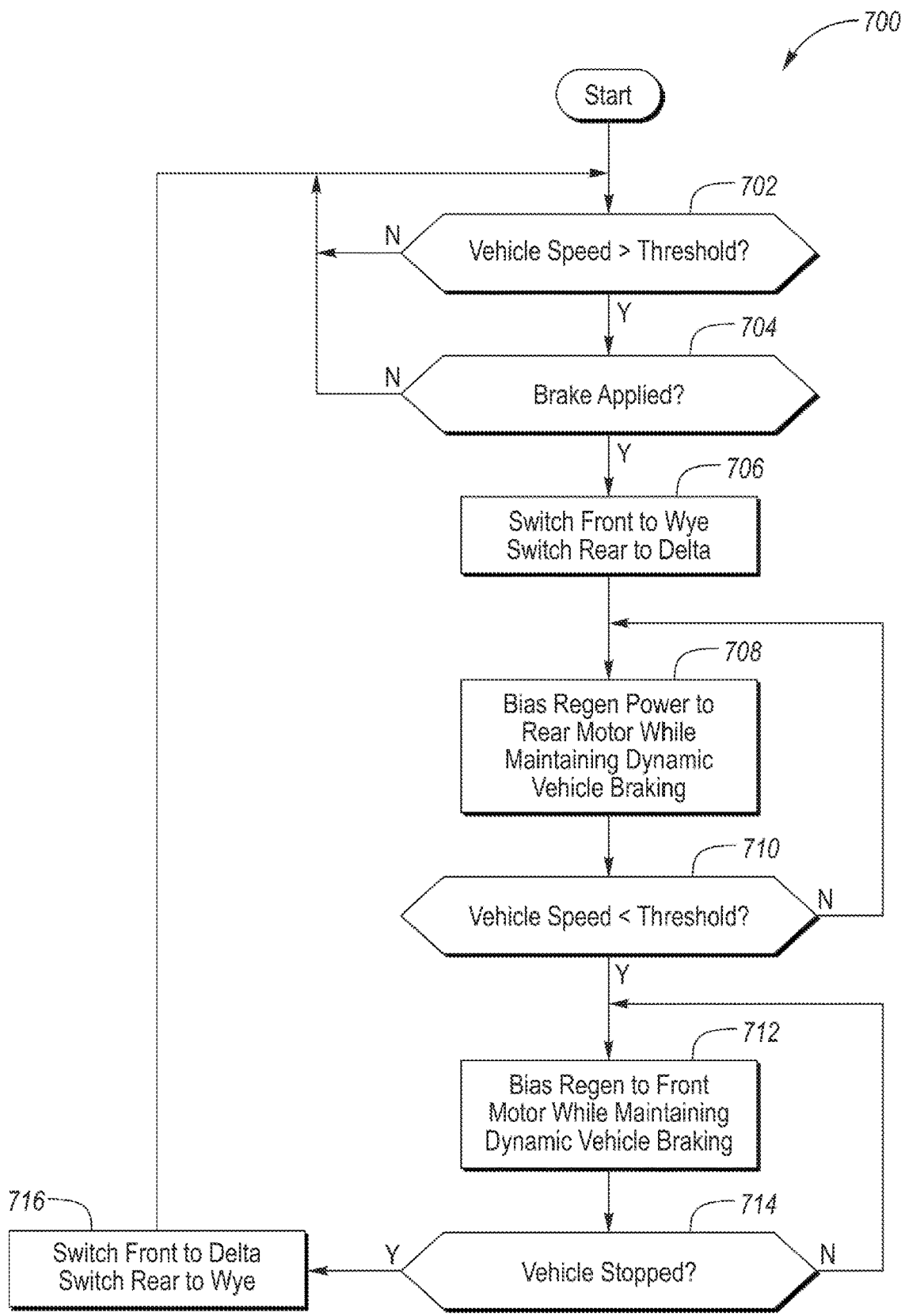
FIG. 7 is a flow chart for a possible sequence of operations for changing the winding connections during regenerative braking events.

FIG. 7 depicts a flowchart 700 for a possible sequence of operations for determining the electric machine connections during regenerative braking events. Operation may start with the front-drive electric machine 112A connected in the delta configuration and the rear-drive electric machine 112B connected in the wye configuration. At operation 702, a check may be performed to determine if the vehicle speed is greater than a predetermined speed threshold. The predetermined speed threshold may correspond to the cross-over speed 306 of FIG. 3. If the vehicle speed is less than or equal to the predetermined speed threshold, the connection may remain the same and operation 702 may be repeated. If the vehicle is speed is greater than the predetermined speed threshold, operation 704 may be performed. At operation 704, a check may be performed to determine if the brake is applied or a braking event is in progress. The brake may be applied if a brake pedal position sensor value exceeds a predetermined value or threshold. If the brake is not applied, the connections may remain the same and operation 702 may be repeated. If the brake is applied, operation 706 may be performed.

At operation 706, the front-drive electric machine 112A may be switched to the wye connection and the rear-drive electric machine 112B may be switched to the delta connection. The switching may be performed if the vehicle is at a steady speed. The vehicle may be at a steady speed if the magnitude of a rate of change of the vehicle speed (e.g., acceleration) is less than a predetermined magnitude. The wye connection for the front-drive electric machine 112A may provide peak regenerative torque to the front wheels to aid in dynamic braking and the shifting weight of the vehicle. The wye connection allows for the application of additional torque to the front wheels during a hard-braking event. The delta connection for the rear-drive electric machine 112B permits higher regenerative power to be returned at higher speeds. As described previously, one of the electric machine connections may be changed at a time to minimize torque disruption.

At operation 708, the regenerative power may be biased to the rear-drive electric machine 112B while maintaining dynamic vehicle braking. For example, the rear-front power split may be 80/20. By biasing the power to the delta connected machine, higher power may be transferred to the traction battery 124 during braking events at higher speeds. At operation 710, a check may be performed to determine if the vehicle speed has fallen below the predetermined speed threshold. If the vehicle speed is greater than the predetermined speed threshold, operation 708 may be repeated. If the vehicle speed is less than the predetermined speed threshold, operation 712 may be performed.

At operation 712, the regenerative power may be biased to the front-drive electric machine 112A while maintaining dynamic vehicle braking. For example, the rear-front power split may be 30/70. The wye connection for the front-drive electric machine 112B permits higher regenerative power to be returned at lower speeds. At operation, 714, a check may be performed to determine if the vehicle is stopped. The vehicle may be stopped if the vehicle speed is less than a low-speed threshold (e.g., 1 kph). If the vehicle is not stopped, operation 712 may be repeated. If the vehicle is stopped, operation 716 may be performed.

At operation 716, the front-drive electric machine 112A may be switched to the delta connection and the rear-drive electric machine 112B may be switched to the wye connection (e.g., default mode). This may place the drivetrain back into the starting configuration. The sequence may then be repeated. A similar strategy may be employed with permanently-connected electric machines. Operations related to switching connections may not be performed for permanently-connected electric machines. However, the torque biasing operations may be applied.

The system and methods described herein improves electric propulsion systems by utilizing different electric machine connection strategies in the same vehicle powertrain. The connection strategies offer different advantages that can improve performance. The connection strategies can affect the maximum torque capability and efficiency of the system. The control strategy can utilize each of the connection strategies at different times to improve system performance. The system can provide peak performance and optimizes the electric drive system.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   first and second electric machines driven by inverters and coupled to first and second sets of wheels, respectively;

switches configured to selectively couple the inverters to the electric machines in a wye and a delta connection; and a controller programmed to operate the switches to selectively couple the first electric machine in the wye connection and the second electric machine in the delta connection responsive to a speed of the vehicle being less than a speed threshold and operate the switches to change the first electric machine from the wye connection to the delta connection responsive to the speed exceeding the speed threshold.

2. The vehicle of claim 1 wherein the speed threshold corresponds to that speed at which a maximum torque of the first electric machine in the wye connection falls below a maximum torque of the second electric machine in the delta connection.

3. The vehicle of claim 1, wherein the controller is further programmed to operate the switches to change the second electric machine from the delta connection to the wye connection, responsive to a torque demand exceeding a torque threshold and the speed being less than the speed threshold.

4. The vehicle of claim 3 wherein the torque threshold corresponds to a sum of a maximum torque of the first electric machine connected in the wye connection and a maximum torque of the second electric machine connected in the delta connection.

5. The vehicle of claim 1 wherein the controller is further programmed to operate the inverters to proportion torque between the first electric machine and the second electric machine to satisfy a torque demand.

6. The vehicle of claim 1 wherein the controller is further programmed to operate the inverters to proportion torque between the first electric machine and the second electric machine to satisfy a torque demand and maximize system efficiency.

7. The vehicle of claim 1 wherein the controller is further programmed to, responsive to the speed crossing from less than the speed threshold to greater than the speed threshold, operate the inverter associated with the first electric machine to drive a torque of the first electric machine to zero before operating the switches to selectively connect the first electric machine in the delta connection.

8. The vehicle of claim 7 wherein the controller is further programmed to, operate the inverter associated with the first electric machine to increase torque of the first electric machine to satisfy a torque demand.

9. The vehicle of claim 1 wherein the controller is further programmed to operate the inverters to proportion torque between the first electric machine and the second electric machine such that as the speed increases torque allocated to the first electric machine decreases and torque allocated to the second electric machine increases.

10. A vehicle comprising:
a first electric machine coupled to a first set of wheels and connected to a first inverter in a wye configuration;
a second electric machine coupled to a second set of wheels and connected to a second inverter in a delta configuration; and
a controller programmed to, responsive to a speed of the vehicle being less than a first speed threshold, operate the first and second inverters to satisfy a torque demand by proportioning the torque demand between the first and second electric machines, and, responsive to the speed being greater than the first speed threshold and the torque demand being less than a torque threshold, operate the first and second inverters to satisfy the torque demand entirely by the second electric machine.

11. The vehicle of claim 10 wherein the torque threshold and the first speed threshold correspond to torque and speed values at which a maximum torque of the second electric machine equals a maximum torque of the first electric machine.

12. The vehicle of claim 10 wherein the controller is further programmed to, responsive to the speed being less than a second speed threshold that is less than the first speed threshold, allocate the torque demand to the first electric machine and operate the first and second inverters to drive the first electric machine to satisfy the torque demand.

13. The vehicle of claim 10 wherein the controller is further programmed to, responsive to the speed exceeding the first speed threshold and the torque demand being greater than the torque threshold, allocate a difference between the torque demand and the torque threshold to the first electric machine and operate the first and second inverters to drive the electric machines to satisfy the torque demand.

14. The vehicle of claim 10 wherein the controller is further programmed to operate the first and second inverters to proportion the torque demand between the first and second electric machines such that as the speed increases torque allocated to the first electric machine decreases and torque allocated to the second electric machine increases and as the speed decreases torque allocated to the first electric machine increases and torque allocated to the second electric machine decreases.

15. The vehicle of claim 10 wherein the controller is further programmed to operate the first and second inverters to proportion the torque demand between the first and second electric machines to maximize system efficiency.

16. A method comprising:
by a controller,
operating switches to selectively connect a first electric machine in a delta connection and a second electric machine in a wye connection;
operating inverters coupled to the electric machines to proportion a torque demand to the electric machines; and
operating the switches to change the first electric machine from the delta connection to the wye connection responsive to the torque demand exceeding a torque threshold and a speed of the electric machines being less than a speed threshold.

17. The method of claim 16 wherein the torque threshold is a maximum torque achievable with the first electric machine connected in a delta connection.

18. The method of claim 16, wherein the speed threshold corresponds to that speed at which a maximum torque of the first electric machine in the wye connection falls below a maximum torque of the first electric machine in the delta connection.

19. The method of claim 16 further comprising operating the inverters to reduce torque to the first electric machine to zero before operating the switches to change from the delta connection to the wye connection.

20. The method of claim 19 further comprising operating the inverters to ramp torque to the first electric machine to satisfy the torque demand after being connected in the wye connection.

* * * * *